United States Patent
Mäder (10) Patent No.: US 11,371,347 B2
(45) Date of Patent: Jun. 28, 2022

(54) METHOD AND SYSTEM PROVIDING AUGMENTED REALITY FOR MINING OPERATIONS

(71) Applicant: MY VIRTUAL REALITY SOFTWARE AS, Oslo (NO)

(72) Inventor: Urban Mäder, Ebertswil (CH)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 37 days.

(21) Appl. No.: 16/200,387

(22) Filed: Nov. 26, 2018

(65) Prior Publication Data

US 2019/0178081 A1    Jun. 13, 2019

(30) Foreign Application Priority Data

Dec. 13, 2017  (EP) .................................... 17206957

(51) Int. Cl.
| | | |
|---|---|---|
| *E21C 47/10* | (2006.01) | |
| *G06T 19/00* | (2011.01) | |
| *G06Q 10/06* | (2012.01) | |
| *G06V 20/20* | (2022.01) | |

(52) U.S. Cl.
CPC ......... *E21C 47/10* (2013.01); *G06Q 10/0633* (2013.01); *G06T 19/006* (2013.01); *G06V 20/20* (2022.01)

(58) Field of Classification Search
CPC ........... G06T 7/60; G06T 7/62; G06T 19/006; G06K 9/00671; E21C 47/10; E21C 47/00; E02F 9/264; G06Q 10/0633
See application file for complete search history.

(56) References Cited

U.S. PATENT DOCUMENTS 5,361,211 A  * 11/1994 Lee .......................... E02F 9/123
                                                          340/679
9,024,972 B1    5/2015  Bronder et al.
(Continued)

OTHER PUBLICATIONS

Kashiha et al., "Automatic Weight Estimation of Individual Pigs Using Image Analysis", Sep. 2014, Elsevier, vol. 107, pp. 38-44 (Year: 2014).*

(Continued)

*Primary Examiner* — Kent W Chang
*Assistant Examiner* — Jonathan M Cofino
(74) *Attorney, Agent, or Firm* — Maschoff Brennan (57) ABSTRACT

A method for real-time presentation of information to an operator of a mining operation, the information relating to at least a first stone block to be removed from an exploitation site, the method comprising capturing with a camera a video stream of the mining operation of the first block, recognizing the first block in the video stream; extracting image data of the first block from the video stream; determining, based on the image data, at least one parameter of the first block, obtaining, based on the parameter, information related to the mining operation; and visualizing the video stream in real time to the operator on a display, the video stream comprising an image of the first block, wherein visualizing the video stream comprises using augmented reality techniques to visualize the image of the first block in an accentuated manner, and overlay the video stream with the information.

18 Claims, 7 Drawing Sheets

(56) References Cited

U.S. PATENT DOCUMENTS

| | | | |
|---|---|---|---|
| 2003/0156739 A1* | 8/2003 | Hinton | G06T 7/0004 |
| | | | 382/109 |
| 2007/0129869 A1* | 6/2007 | Gudat | G05D 1/0297 |
| | | | 701/50 |
| 2009/0256860 A1 | 10/2009 | Nichols | |
| 2011/0125471 A1* | 5/2011 | Craig | E21B 43/26 |
| | | | 703/6 |
| 2012/0139325 A1 | 6/2012 | Norberg et al. | |
| 2014/0184643 A1 | 7/2014 | Friend | |
| 2014/0188333 A1 | 7/2014 | Friend | |
| 2014/0270480 A1* | 9/2014 | Boardman | G06T 17/00 |
| | | | 382/154 |
| 2015/0078653 A1* | 3/2015 | Tafazoli Bilandi | G06K 9/4604 |
| | | | 382/154 |
| 2015/0199847 A1 | 7/2015 | Johnson et al. | |
| 2016/0292846 A1 | 10/2016 | Sprock et al. | |
| 2018/0162410 A1* | 6/2018 | Skillsater | B60W 50/14 |
| 2021/0047804 A1* | 2/2021 | Canepari | E02F 9/265 |

OTHER PUBLICATIONS

Thurley, "Automated Image Segmentation and Analysis of Rock Piles in an Open-Pit Mine", Nov. 2013, IEEE, 2013 International Conference on Digital Image Computing: Techniques and Applications (DICTA), pp. 1-8 (Year: 2013).*

European Search Report dated Mar. 20, 2018 as received in U.S. Appl. No. 17/206,957.

Claudio A. Perez et al: "Ore grade estimation by feature selection and voting using boundary detection in digital image analysis", International Journal of Mineral Processing, Elsevier Science Publishers, Amsterdam, NL, vol. 101, No. 1, Jul. 10, 2011, pp. 28-36.

* cited by examiner

METHOD AND SYSTEM PROVIDING AUGMENTED REALITY FOR MINING OPERATIONS

CROSS-REFERENCE TO RELATED APPLICATIONS

This application claims priority to European Patent Application No. 17206957.7, filed on Dec. 13, 2017. The foregoing patent application are incorporated herein by reference.

FIELD OF INVENTION

The present invention pertains to a method for real-time presentation of information related to a stone block that is to be moved in the course of a mining operation. The information is to be presented to an operator of the mining operation, and is presented using augmented reality techniques. The invention also pertains to an augmented reality system for performing said method.

BACKGROUND

The use of augmented reality techniques in mining or earth-moving processes is generally known, e. g. from the prior art documents US 2014/0184643 A1, US 2012/0139325 A1, US 2009/0256860 A1 or US 2014/0188333 A1.

Mining in stone quarries comprises a step of removing blocks from the exploitation site and of transporting them to another site for further processing. This removing and transporting can be performed e. g. by wheel loaders or by excavators in combination with dumper trucks. The blocks can either be boulders as well as rocks created by fragmenting bedrock, e. g. through breakage by blasting.

Normally, blocks of various sizes are present at the exploitation site, wherein some of the blocks are too big for removal or transport and need to be fragmented into smaller parts first. For an operator of a vehicle that is adapted to remove the blocks, i.e. a wheel loader or an excavator, it is often difficult to determine whether a certain block can be transported or needs to be fragmented.

Trying to remove and transport a block that is too big and thus too heavy can effect damages at the used vehicles and can even cause accidents if the block's weight lets the vehicle overturn. Also, a constant excavation and transport of blocks that are only slightly too heavy can wear down the equipment excessively.

There is thus a need for a method and system that facilitates this step for the operator.

BRIEF DESCRIPTION

It is therefore an object of some embodiments of the present invention to provide an improved method for real-time presentation of information for use in an excavating operation.

It is moreover an object of some embodiments, to provide an augmented reality system for execution of said method and a mining vehicle comprising such a system.

At least one of these objects is achieved by the method according to claim 1, the augmented reality device according to claim 13, the mining vehicle according to claim 15 and/or the dependent claims of the present invention.

A first aspect of some embodiments of the present invention relate to a method for generating information and presenting the information to an operator of a mining operation in real-time. Said information is related to at least a first stone block to be removed from an exploitation site in the course of the mining operation. According to the invention, the method comprises capturing with a camera a video stream of the mining operation of the first block;

recognizing the first block in the video stream;

extracting image data of the first block from the video stream;

determining, based on the image data, at least one parameter of the first block;

obtaining, based on the parameter, information related to the mining operation; and visualizing the video stream in real time to the operator on a display, the video stream comprising an image of the first block, wherein visualizing the video stream comprises using augmented reality techniques to visualize the image of the first block in an accentuated manner, and overlay the video stream with the information.

According to an embodiment of the method, the information comprises an instruction of whether or not to remove the first block. According to another embodiment of the method, the information comprises an instruction of whether or not to fragment the first block. In particular, one of these instructions is overlaid on the image of the first block when visualizing the video stream.

According to a further embodiment, determining the at least one parameter comprises calculating or estimating a weight of the first block based on the image data, particularly wherein the information comprises a weight specification of the first block.

According to a further embodiment—if the vehicle is a wheel loader or an excavator adapted to remove the first block, or a truck, particularly a dumper truck, adapted to transport the first block—the method comprises obtaining a weight allowance value of a vehicle that is deployed in the mining operation. Alternatively or additionally, the method comprises calculating a weight of a present load of the vehicle, i.e. a total weight of all blocks that are currently loaded.

According to a further embodiment, the method comprises determining a position of the exploitation site and/or of the first block, particularly using a global navigational satellite system, and obtaining composition data related to a typical composition of block material at the determined position, wherein calculating or estimating the weight is also based on the composition data.

According to a further embodiment, determining the at least one parameter comprises calculating or estimating a slope of a ground on which the first block is positioned, wherein calculating or estimating the slope is based on the image data, and/or the method further comprises determining a position of the first block, and obtaining profile data related to a terrain profile at the position of the first block, wherein calculating or estimating the slope is based on the on the profile data.

According to a further embodiment, determining the at least one parameter comprises calculating or estimating a risk and possible extent of a mass movement if the first block would be removed. In particular, the mass movement involves further blocks at the exploitation site, and determining the at least one parameter comprises calculating or estimating, based on the image data, a position of at least a second block at the exploitation site relative to the first block, in particular positions of a plurality of further blocks.

According to a further embodiment, the at least one parameter is determined at a remote server computer, and the method further comprises transmitting the image data to the server computer. Alternatively, the parameter can be determined by means of a local calculation unit.

According to a further embodiment, at least two video streams of the mining operation of the first block are captured with at least two cameras or by means of a 3D camera, wherein the first block is recognized in the at least two video streams, and image data of the first block is extracted from the at least two video streams, particularly wherein the at least two video streams are visualized to the operator as a three-dimensional video stream.

According to a further embodiment, the method comprises capturing at least one range image of the mining operation of the first block, wherein determining the at least one parameter of the first block is also based on the at least one range image. In particular, the camera is built as a RIM-camera adapted to capture the range image, particularly adapted to capture a multitude of range images while capturing the video stream.

According to a further embodiment, the method comprises extracting image data of a multitude of blocks from the video stream, and determining, based on the image data, at least one parameter of each of the multitude of blocks, particularly wherein the information is overlaid on the image of the respective block when visualizing the video stream.

A second aspect of some embodiments of the present invention relate to an augmented reality system adapted for use in a mining operation of a first stone block, particularly for use in a method according to the first aspect of the invention. The system comprises
- a camera that is adapted to capture a video stream,
- a position acquisition unit that is adapted to obtain position information, particularly of the camera,
- an image recognition unit that is adapted to recognize features in the video stream and to obtain image data related to the feature from the video stream;
- a calculation unit that is adapted to determine, based on the image data, at least one parameter of the feature,
- an image augmentation unit that is adapted to create an augmented video stream by overlaying the video stream in real time with content that is based on the parameter, and
- a display that is adapted to visualize the augmented video stream to an operator of the device.

According to some embodiments of the invention,
- the video stream is a video stream of the mining operation of the first block;
- the image recognition unit is adapted to recognize the first block in the video stream and to extract image data of the first block from the video stream;
- the calculation unit is adapted to determine, based on the image data of the first block, at least one parameter that is related to the first block, and to calculate and/or estimate, based on the parameter, information that is related to the mining operation; and
- the image augmentation unit is adapted to create the augmented video stream in such a way that an image of the first block in the video stream is accentuated and the video stream is overlaid with the information.

According to one embodiment, the camera is built as a 3D-camera adapted to capture at least two video streams of the mining operation of the first block from different positions and/or with different angles.

According to another embodiment, the camera is built as a RIM-camera adapted to capture at least one range image of the mining operation of the first block, particularly adapted to capture a multitude of range images while capturing the video stream.

A third aspect of the present invention relates to a mining vehicle—such as a wheel loader or an excavator—comprising an augmented reality system according to the second aspect.

BRIEF DESCRIPTION OF THE DRAWINGS

The invention in the following will be described in detail by referring to exemplary embodiments that are accompanied by figures, in which.

DETAILED DESCRIPTION

Figure 1A:
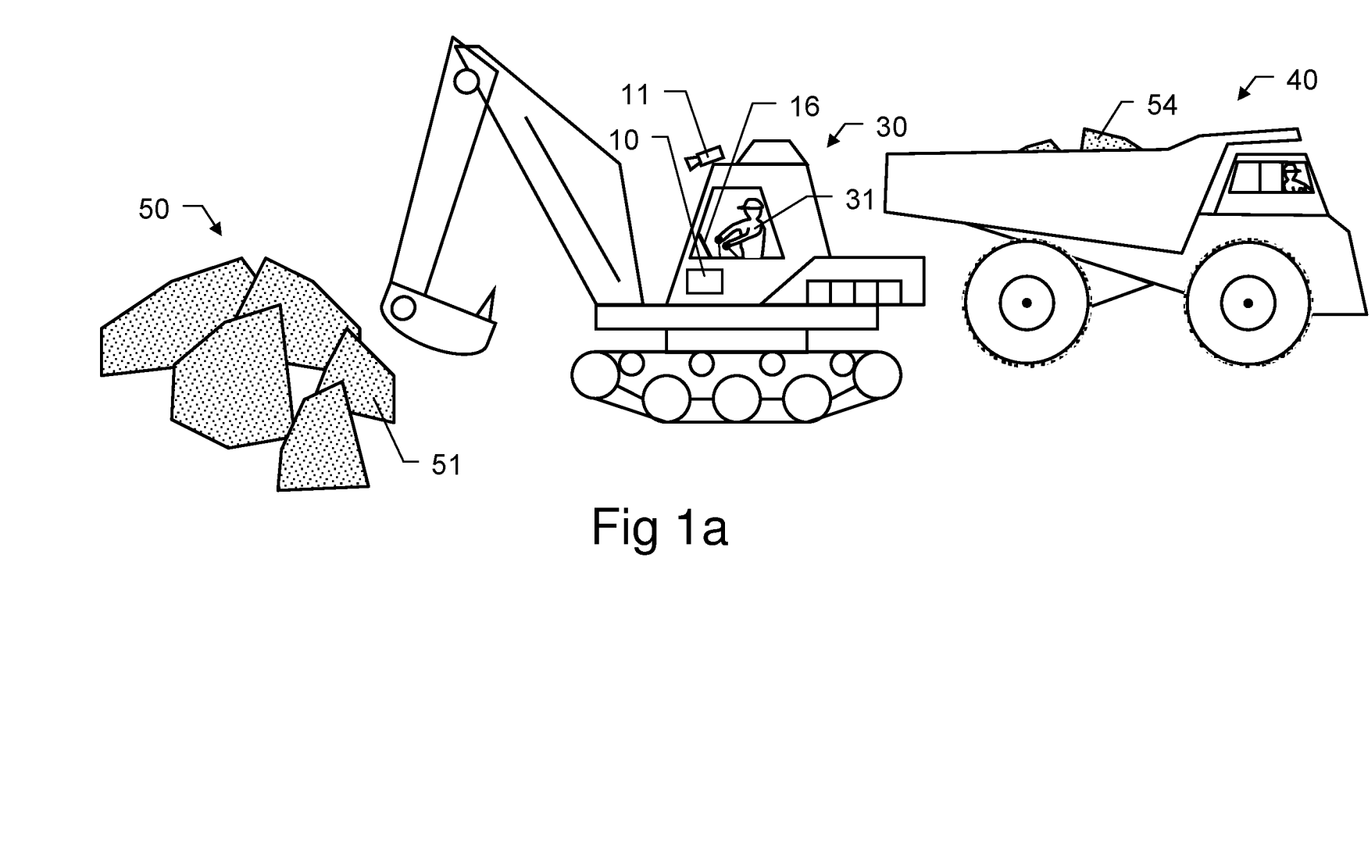
FIGS. 1a-b show a mining operation related to the removal of blocks from an exploitation site.
Figure 1B:
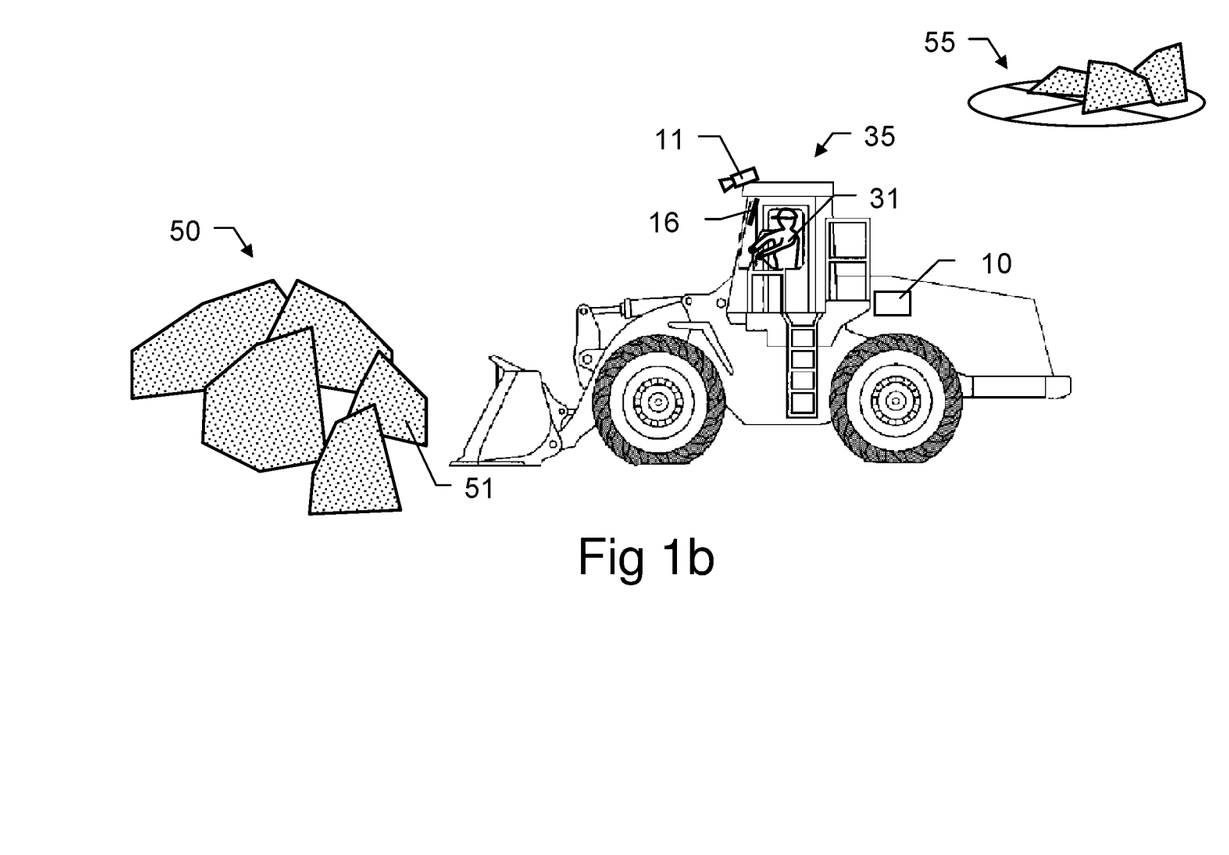

In FIGS. 1a and 1b a mining operation is illustrated. In an exploitation site 50 a number of stone blocks is situated, a first block 51 of which about to being removed from the exploitation site 50. In FIG. 1a this is to be performed by an excavator 30 which is to be load the blocks on a dumper truck 40 that transports a number of blocks 54 to a remote processing site (not shown). In FIG. 1b the first block 51 is to be removed by a wheel loader 35 that transports the block to a nearby block stockyard 55.

The excavator 30 and wheel loader 35 are operated by a human operator 31 who needs to decide whether the block 51 is fit for being removed and transported. From his position in the excavator 30 this decision can be difficult, especially for a novice in the field, as there are a number of parameters to be considered at the same time.

These parameters on the one hand comprise a size and weight of the block 51 which need to be considered in view of an excavation capacity of the excavator 30 and/or wheel loader 35 and a still available payload of the truck 40. If the block is too big and/or too heavy for being transported with the already partially loaded truck, its removal needs to be postponed until the arrival of the next truck. If a block's size or weight exceeds the excavator's capacity and/or the truck's total payload, it needs to be fragmented first, e. g. by means of dynamite or air hammer.

The parameters on the other hand also comprise a slope of the ground and the relative positions of the plurality of blocks at the exploitation site 50. These need to be considered to prevent a possible mass movement (e. g. a landslide) that might occur if a certain block 51 is moved.

To aid the operator 31 in considering these parameters, the operated mining vehicle 30, 35 is equipped with an augmented reality system according to the invention. The system comprises a camera 11 that is directed to the exploitation site 50 and the first block 51 and captures a video stream of the same. The system furthermore comprises a display unit 16 that visualizes the video stream captured by the camera 11 to the operator 31. The augmented reality system furthermore comprises a computing device 10 comprising computing means that allow the visualized video stream to be augmented by automatically generated instructions and/or information that help the operator 31 in his decisions.

Optionally, more cameras than the one camera 11 shown here may be used for capturing images or video streams. In particular, a 3D camera setup can be used that is adapted to capture at least two video streams of the mining operation of the first block 51 from different positions and with different angles. Also, one or more cameras can be mounted on one or more unmanned aerial vehicles (UAV), such as camera drones.

Figure 2A:
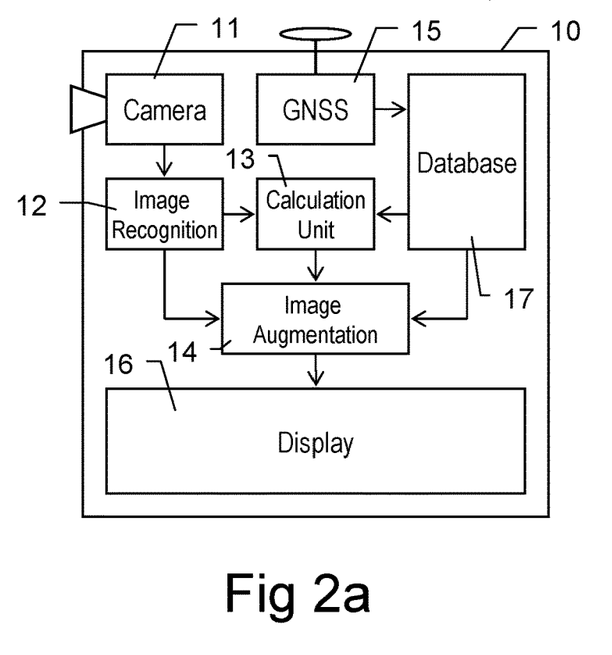
FIGS. 2a-b show two exemplary embodiments of an augmented reality device according to the invention.
Figure 2B:
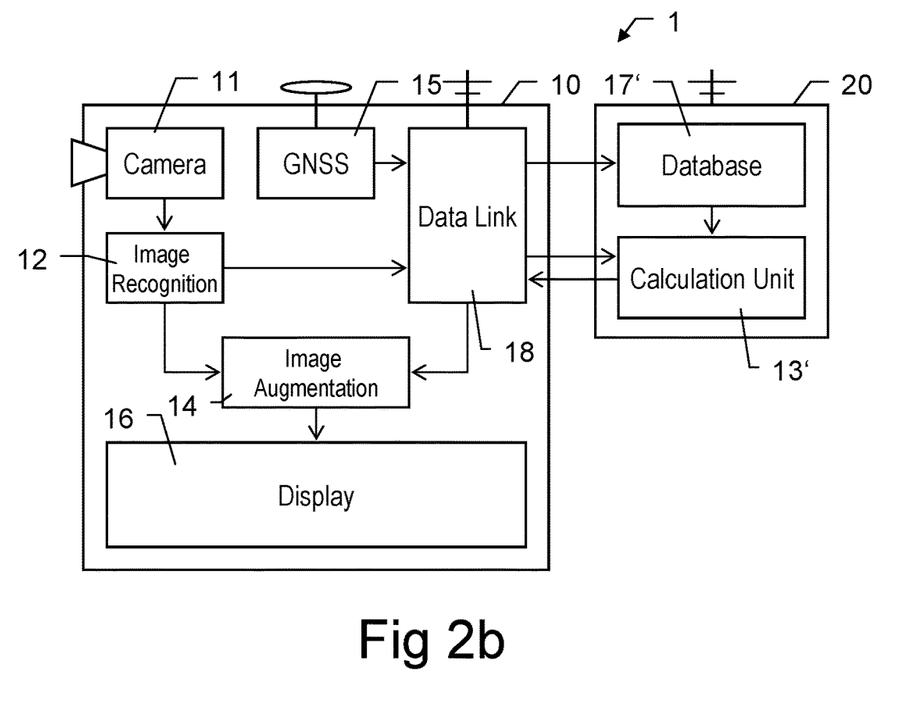

FIGS. 2a and 2b illustrate two exemplary embodiments of an augmented reality system 1 according to the invention.

In FIG. 2a, the system 1 comprises a device 10 having a camera 11 that is adapted to capture a video stream, a position acquisition unit 15 that is adapted to obtain position information of the device 10, and a display 16 that is adapted to display an augmented video stream. The device 10 furthermore comprises computing means that allow the creation of the augmented video stream. These comprise an image recognition unit 12 that is adapted to obtain image data from the video stream, a calculation unit 13 that is adapted to determine, based on the image data, at least one parameter, an image augmentation unit 14 that is adapted to create the augmented video stream by overlaying the video stream in real time with content that is based on the parameter. In FIG. 2a, the device 10 also comprises a database 17.

In FIG. 2b, the database 17' and a part of the computing means, here the calculation unit 13' are not part of the device 10 but of a remote server computer 20 which forms part of the system 1. The device 10 comprises a data link unit 18 that is adapted to establish a wireless data connection with the server computer 20, e. g. by means of an Internet connection.

The components that are shown here to be part of a single device 10 of course as well can be provided in a system 1 comprising a number of units, e. g. that are distributed over the operated vehicle. A simple example is shown in FIGS. 1a and 1b, where the camera 11 and the display 16 are provided separately from a device 10 comprising the computing means.

FIGS. 3a to 3d show a display 16 of an exemplary embodiment of an augmented reality system according to the invention with four exemplary outputs displayed thereon.

Figure 3A:
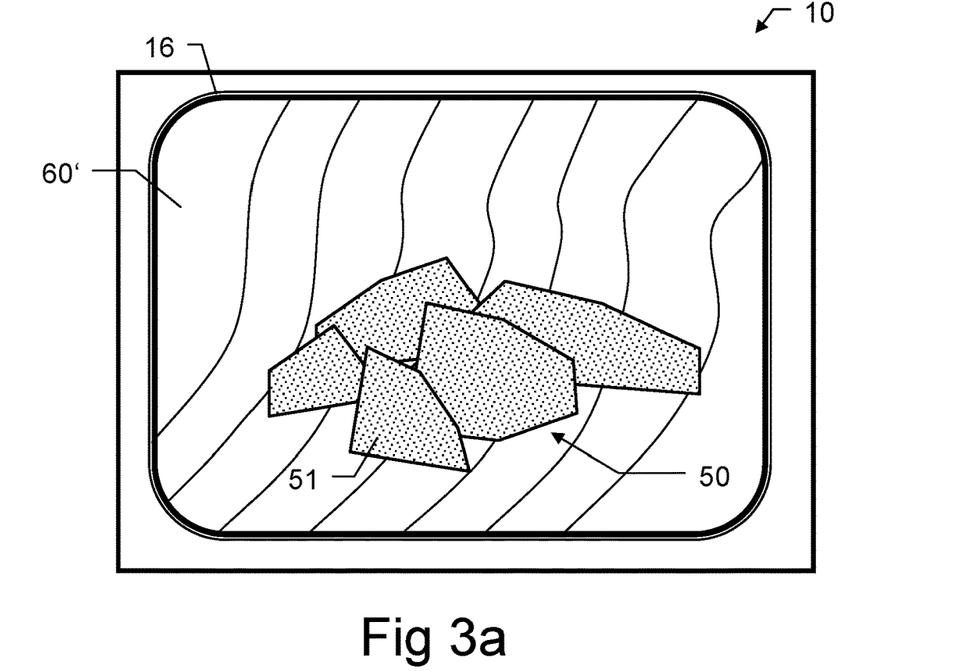
FIGS. 3a-d show exemplary outputs on a display of an exemplary embodiment of an augmented reality device according to the invention.

Although the shown display 16 is integrated into the device 10, of course it could be provided separate. In a particular embodiment, the display 16 can be adapted as virtual reality (VR) goggles or as extended reality (XR) goggles.

In FIG. 3a the display 16 shows the video stream 60 without any augmented reality content. The operator (not shown here) can see the exploitation site 50 of FIG. 1 with a number of blocks. The operator considers block 51 to be the next block to be removed.

Figure 3B:
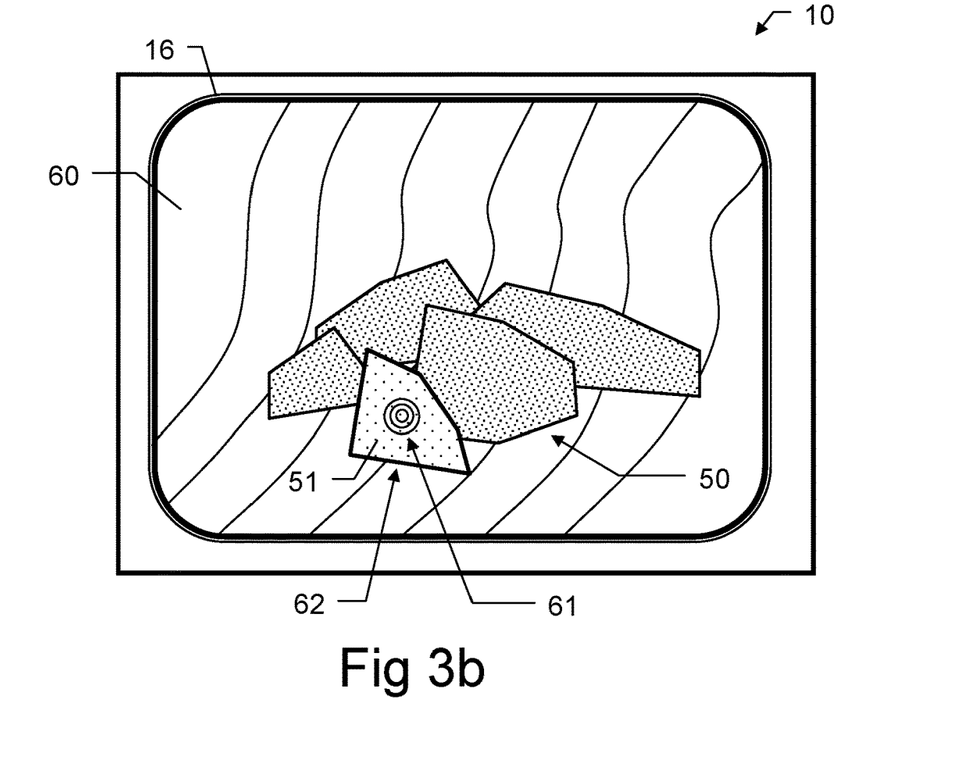

FIG. 3b shows the display 16 of FIG. 3a, wherein the same video stream 60 is displayed. The operator has selected block 51. In this case, the display 16 is adapted as a touchscreen and the block has been selected by tapping (illustrated by icon 61) on the corresponding part of the display 16 showing block 51.

As a result of the selection, block 51 which is recognized in the video stream 60 is visualized highlighted (illustrated by frame 62 and different colouring).

Figure 3C:
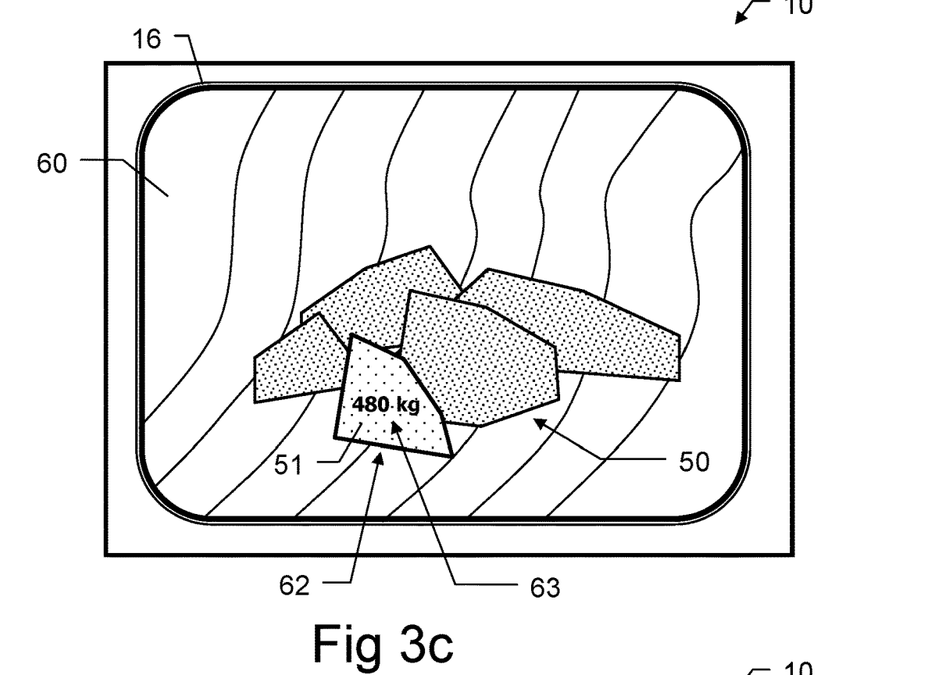

FIG. 3c shows the display 16 and video stream 60 of FIG. 3b, wherein information regarding the block 51 is visualized in the video stream on the same block 51. Here, the information is a weight information 63.

After having recognized the selected block 51 in the video stream, image data of the block 51 has been extracted, and a weight of the block 51 has been estimated or calculated based on the image data. Preferably, obtaining parameters like this can also be based on further data, in this case e. g. on a known average composition of the blocks at the exploitation site 50.

The estimated or calculated weight of the selected block 51 is then displayed as weight information 63 in the augmented video stream 60, e. g. directly overlaid over the image of the selected block 51.

Figure 3D:
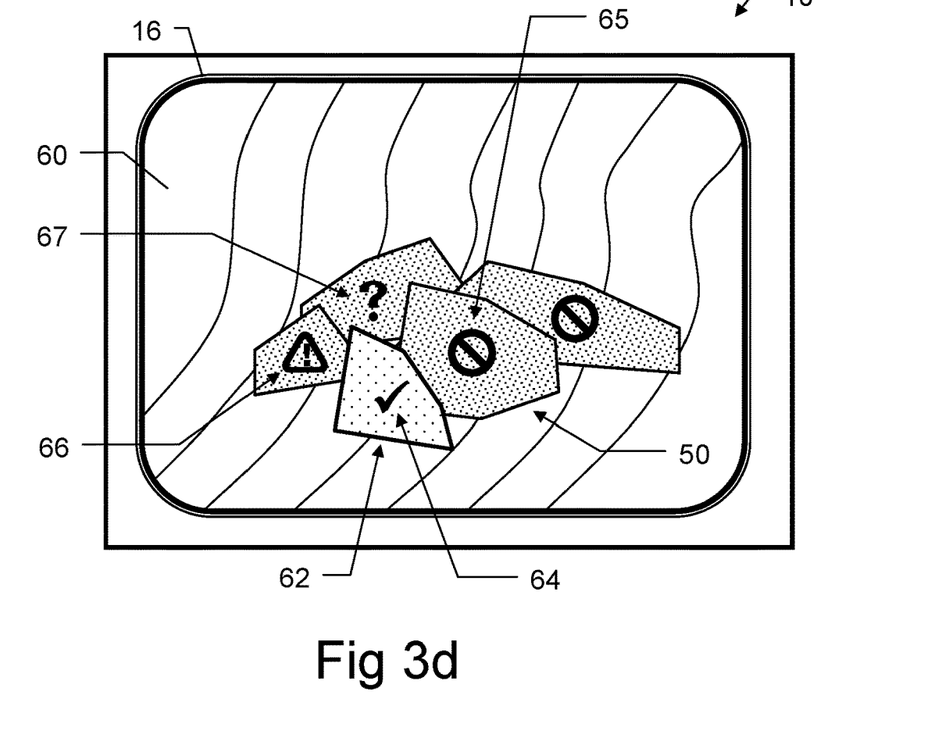

FIG. 3d shows the display 16 of FIG. 3a, wherein the same video stream 60 is displayed. The blocks at the exploitation site 50 have been recognized automatically and considered with respect to their extractability.

Two blocks that are considered to be too heavy have been marked with icon 65, signalling to the operator not to remove them but to wait for their fragmentation.

One block, the removal of which is considered to be too dangerous, e. g. because it might trigger a mass movement due to an inclination of the ground and other blocks leaning on this block, has been marked with warning icon 66, signalling to the operator not to remove this block, e. g. before the site 50 has been secured against the possible mass movement.

Another block has been recognized, but too much of its surface is covered by other blocks in order to estimate its size and thus its weight. It is thus marked with icon 67, signalling to the operator to remove other blocks first in order to allow considering transportability of this block.

One block is considered to be removable. It is thus marked with icon 61 signalling to the operator that this block is removable. It is further highlighted by means of a frame 62, signalling to the operator that this block should be the next one to be removed.

Figures 4, 5:
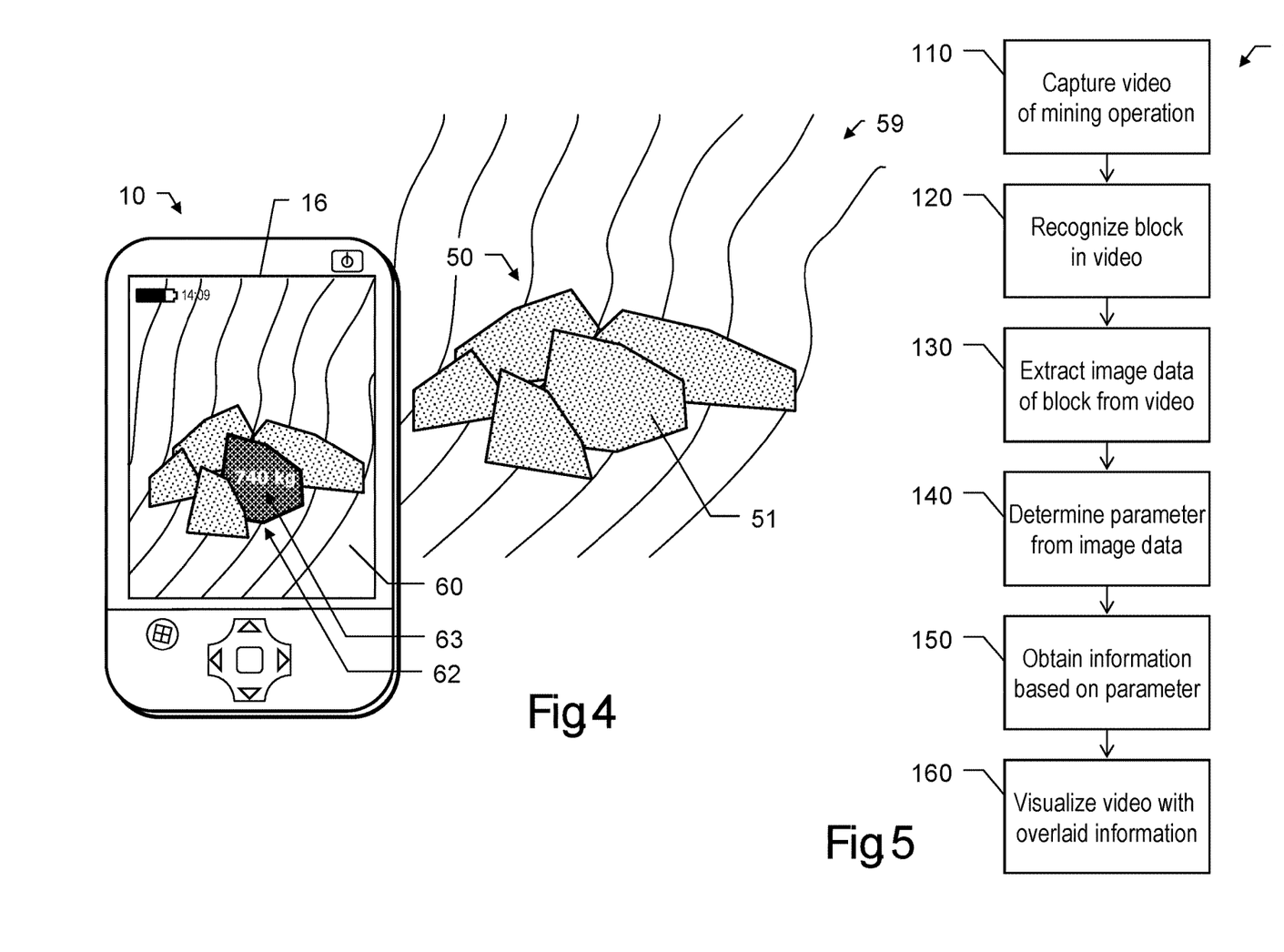
FIG. 4 shows an exemplary output on a display of another exemplary embodiment of an augmented reality device according to the invention.
FIG. 5 shows a flow chart illustrating a first embodiment of a method according to the invention.

FIG. 4 shows another exemplary embodiment of a device 10 as a part of a system according to the invention, being embodied as a hand-held device 10 having a display 16 on a front side facing the user and a camera (not shown) on a rear side facing the exploitation site 50. The camera captures a video of the exploitation site 50 comprising images of a first block 51. As described above, this block can be recognized in the video, so that upon selection by the user it can be highlighted in the displayed video 60 (different colouring 62), and selected information regarding the block 51, e. g. its weight 63, can be displayed in the video 60.

This embodiment of the system comprising the shown handheld device 10 can be used outside a vehicle, e. g. by a user determining which blocks need to be further fragmented before the blocks are removed by means of an excavator or a wheel loader (see FIGS. 1a, 1b). The handheld device 10 can further comprise the computing means shown in FIG. 2a—either partially or completely. Preferably, it can be equipped with a GNSS sensor and be connectable to the Internet to access a database on a remote server (see FIG. 2b).

As shown in FIG. 4, also a surrounding of the block is captured, so that, e. g. by means of feature extraction and/or image recognition, a slope 59 of the terrain at the exploitation site 50 is determinable.

One or more camera drones can be used to capture images from various positions to facilitate estimation or calculation of a block's weight, to determine possible dangers or determine the slope 59. Optionally, an augmented video stream might be presented from different view points.

Figure 6:
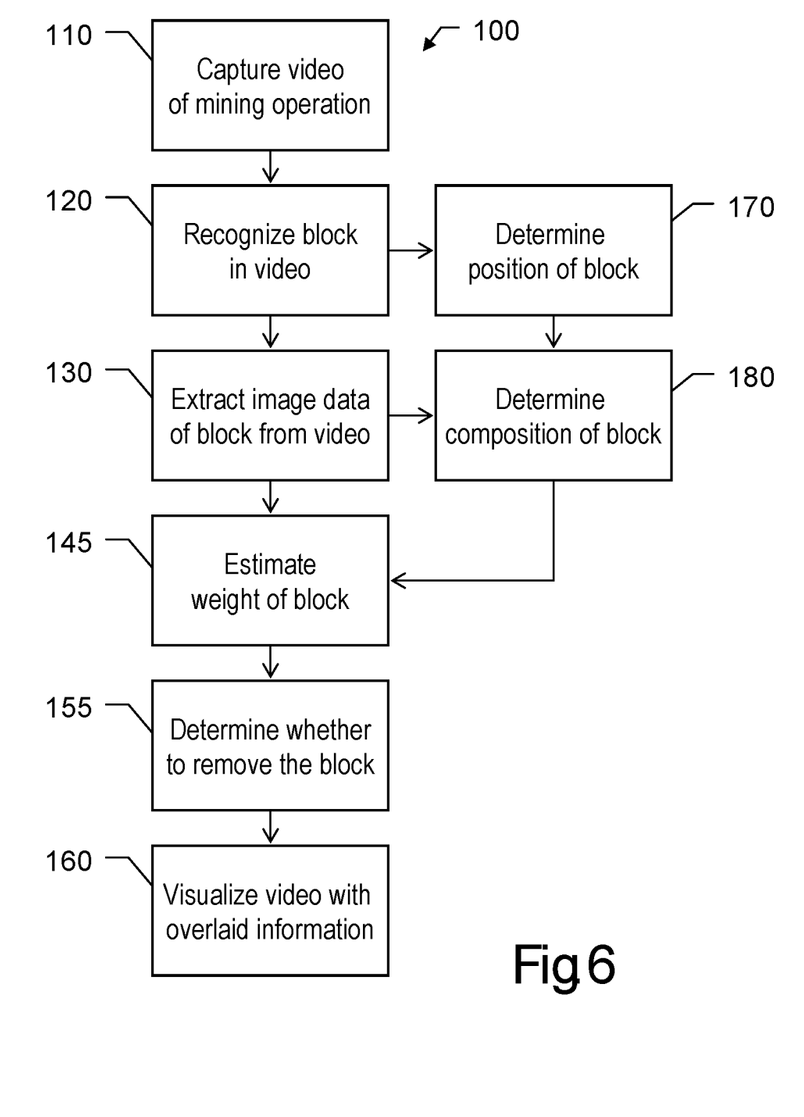
FIG. 6 shows a flow chart illustrating a second embodiment of a method according to the invention.

In FIGS. 5 and 6 two exemplary embodiments of a method 100 according to the invention are illustrated by means of flow charts.

The method of FIG. 5 starts with capturing a video stream of the mining operation (step 110), wherein at least a first block is visible in the video stream. Next, by means of image recognition, the block or a plurality of blocks are identified in the video stream (step 120). Image data belonging to the at least one block is extracted from the video stream (step 130) and one or more parameters (e. g. a block size) are determined based on the extracted image data (step 140). Information is obtained from one or more determined parameters (step 150), e. g. whether or not the block fits into the bucket of the vehicle, and an augmented video stream is displayed (step 160), the augmented video stream comprising the information overlaid over the original video stream.

Also in the second embodiment of the method 100 which is illustrated in FIG. 6, the method 100 starts with capturing a video stream of the mining operation (step 110), wherein at least a first block is visible in the video stream. Next, by means of image recognition, the block or a plurality of blocks are identified in the video stream (step 120), and image data belonging to the at least one block is extracted from the video stream (step 130).

In this embodiment, a position of the block is determined (step 170). This is done by means of a GNSS module of the system, which determines a position of the camera. This position might already be used as a rough position of the block. For a more detailed position, a position of the block relative to the camera, i.e. a direction and a distance, can be determined from the captured images. In a particular embodiment, the camera can be equipped with distance measurement means, e. g. a laser distance meter, or be embodied as a range imaging (RIM) camera.

Using the determined position of the block, parameters regarding blocks in said position can be retrieved from a database. In this case a composition of the block is needed in order to determine an approximate weight of the block.

As the position of the camera is known, so is the exploitation site. Also, image data of the block has been extracted, so that a colour and texture of the block is known. This information can be used to estimate in step 180 a composition of the block and thus its density.

In step 145, an estimated weight of the block is then calculated from the size of the block that can be derived from the extracted image data (step 130) and the density of the block that has been estimated based on the known position and colour and texture (step 180).

In step 155, it is then determined, whether the selected block can be removed, by comparing the weight of the block with known parameters of the involved vehicles. In particular, it is determined whether the used excavator or wheel loader is capable of moving such a weight and if a truck onto which the block is to be loaded can carry the additional weight without being overloaded.

In the last step 160, this information is visualized in the augmented video stream by overlaying an instruction of whether or not to remove the selected block onto the image of the block in the video stream.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for generating information and presenting the information to an operator of a vehicle that is deployed in a mining operation in real time, the vehicle being embodied as a wheel loader or as an excavator and configured for removing blocks from an exploitation site, the method comprising:
    obtaining a weight allowance value of the vehicle;
    capturing with at least two cameras from different positions at least two video streams of the mining operation, each of the video streams imaging the exploitation site and a multitude of blocks situated at the exploitation site;
    visualizing at least one of the video streams in real time to the operator on a display, the at least one of the video streams imaging the multitude of blocks at the exploitation site;
    receiving an operator input, the operator input being provided by the operator by selecting, in one the at least one visualized video streams, a first block from the imaged multitude of blocks;
    recognizing the first block in the at least two video streams based on the operator input;
    extracting image data of the first block from the at least two video streams;
    determining, based on the image data, at least one parameter of the first block, wherein determining the at least one parameter comprises calculating or estimating a weight of the first block based on the image data;
    performing, based at least on the weight allowance value of the vehicle and on the weight of the first block, a determination as to whether the first block should be removed; and
    visualizing an augmented video stream in real time to the operator on a display, the augmented video stream imaging at least the first block at the exploitation site,
    wherein visualizing the augmented video stream comprises using augmented reality techniques to:
        visualize the image of the first block in an accentuated manner, and
        overlay at least one of the video streams with information related to the first block, the information including an instruction as to whether or not to remove the first block from the exploitation site.

2. The method according to claim 1, wherein the information comprises an instruction of whether or not to fragment the first block.

3. The method according to claim 1, further comprising:
    using a truck to transport the first block,
    obtaining a weight allowance value of the truck, and
    calculating a weight of currently loaded blocks.

4. The method according to claim 1, further comprising:
    determining a position of the exploitation site or of the first block; and
    obtaining composition data related to a typical composition of block material at the determined position,
    wherein calculating or estimating the weight is also based on the composition data.

5. The method according to claim 1, further comprising:
    determining the at least one parameter comprises calculating or estimating a slope of a ground on which the first block is positioned, wherein
        calculating or estimating the slope is based on the image data, or
        the method further comprises determining a position of the first block, and obtaining profile data related to a terrain profile at the position of the first block, wherein calculating or estimating the slope is based on the on the profile data.

6. The method according to claim 1, wherein the at least one parameter is determined at a remote server computer, and the method further comprises transmitting the image data to the server computer.

7. The method according to claim 1, further comprising: capturing at least one range image of the mining operation of the first block, wherein determining the at least one parameter of the first block is also based on the at least one range image.

8. The method according to claim 1, further comprising: extracting image data of a multitude of blocks from at least one of the video streams; and determining, based on the image data, at least one parameter of each of the multitude of blocks.

9. The method according to claim 1, wherein at least one of the video streams is captured by a camera that is mounted on the vehicle.

10. The method according to claim 1, wherein the at least two video streams are captured from different positions simultaneously.

11. The method according to claim 1, wherein the at least two video streams are visualized simultaneously.

12. The method according to claim 1, wherein the at least two video streams are overlaid with the information.

13. The method according to claim 1, wherein at least one of the video streams is captured by a camera that is mounted on an unmanned aerial vehicle.

14. An augmented reality system adapted for use in a mining operation of a first block, the system comprising:
at least two cameras that are adapted to capture at least two video streams from different positions;
a position acquisition unit that is adapted to obtain position information of the at least two cameras;
an image recognition unit that is adapted to recognize features in the at least two video streams and to obtain image data related to the feature from the at least two video streams;
a calculation unit that is adapted to determine, based on the image data, at least one parameter of the feature;
an image augmentation unit that is adapted to create an augmented video stream by overlaying at least one of the video stream in real time with content that is based on the parameter; and
a display that is adapted to visualize, in real time, the augmented video stream to an operator of a vehicle that is deployed in the mining operation, the vehicle being embodied as a wheel loader or an excavator and configured for removing blocks from an exploitation site,
wherein:
the at least two video streams are video streams of the mining operation of the first block, each of the two video streams imaging the exploitation site and a multitude of blocks situated at the exploitation site;
the image recognition unit is adapted to recognize the first block in the video streams based on operator input, the operator input being provided by the operator selecting, in one of the at least one visualized video streams, the first block from the multitude of blocks, and to extract image data of the first block from the video streams;
the calculation unit is adapted to determine, based on the image data of the first block, at least one parameter that is related to the first block, wherein determining the at least one parameter comprises calculating or estimating a weight of the first block based on the image data, and to determine, based at least on an excavation capacity of the vehicle and on the weight of the first block, whether the first block should be removed or not; and
the image augmentation unit is adapted to create the augmented video stream in such a way that an image of the first block in the video stream is accentuated and the video stream is overlaid in real time with information related to the first block, the information including an instruction to the operator as to whether or not the first block should be removed according to the determination of the calculation unit.

15. The augmented reality system according to claim 14, wherein at least one of the at least two cameras is built as:
a 3D-camera adapted to capture at least two video streams of the mining operation of the first block from different positions or with different angles, or
a RIM-camera adapted to capture at least one range image of the mining operation of the first block.

16. A mining vehicle comprising an augmented reality system according to claim 14.

17. The augmented reality device according to claim 14, wherein the image augmentation unit is adapted to create augmented video streams by overlaying at least two of the video streams in real time with content that is based on the parameter; and the display is adapted to visualize the augmented video streams to the operator.

18. The augmented reality device according to claim 14, comprising an unmanned aerial vehicle, wherein at least one of the at least two cameras is mounted on the unmanned aerial vehicle.

* * * * *